(12) United States Patent
Kobayashi

(10) Patent No.: US 12,541,041 B2
(45) Date of Patent: Feb. 3, 2026

(54) ANTIREFLECTION FILM

(71) Applicant: DEXERIALS CORPORATION, Shimotsuke (JP)

(72) Inventor: Tomoaki Kobayashi, Tochigi (JP)

(73) Assignee: DEXERIALS CORPORATION, Shimotsuke (JP)

( * ) Notice: Subject to any disclaimer, the term of this patent is extended or adjusted under 35 U.S.C. 154(b) by 832 days.

(21) Appl. No.: 17/624,452

(22) PCT Filed: May 17, 2021

(86) PCT No.: PCT/JP2021/018554
§ 371 (c)(1),
(2) Date: Jan. 3, 2022

(87) PCT Pub. No.: WO2021/235379
PCT Pub. Date: Nov. 25, 2021

(65) Prior Publication Data
US 2022/0357485 A1    Nov. 10, 2022

(30) Foreign Application Priority Data
May 21, 2020 (JP) .................................. 2020-089189

(51) Int. Cl.
*G02B 1/115* (2015.01)
*G02B 1/14* (2015.01)

(52) U.S. Cl.
CPC ................ *G02B 1/115* (2013.01); *G02B 1/14* (2015.01)

(58) Field of Classification Search
CPC ...... G02B 13/0045; G02B 13/18; G02B 9/64; G02B 15/1461; G02B 1/115; G02B 1/14;
(Continued)

(56) References Cited

U.S. PATENT DOCUMENTS

| | | |
|---|---|---|
| 2003/0076465 A1 | 4/2003 | Shimoda et al. |
| 2005/0201422 A1 | 9/2005 | Ohta et al. |

(Continued)

FOREIGN PATENT DOCUMENTS

| | | |
|---|---|---|
| CN | 110954975 A | 4/2020 |
| CN | 111103637 A | 5/2020 |

(Continued)

OTHER PUBLICATIONS

Refractiveindex, Refractive Index of SiO2, https://refractiveindex.info/?shelf=main&book=SiO2&page=Malitson (Year: 2025).*

(Continued)

*Primary Examiner* — Michael Zhang
(74) *Attorney, Agent, or Firm* — Oliff PLC

(57) ABSTRACT

An antireflection film has high infrared transmittance and excellent flexibility. An antireflection layer includes a base material, a hard coat layer, an adhesion layer, and an antireflection layer in this order, wherein the antireflection layer includes, from the adhesion layer side, a first high refractive index layer having an optical thickness of 41 to 52 nm, a first low refractive index layer having an optical thickness of 41 to 53 nm, a second high refractive index layer having an optical thickness of 302 to 313 nm, and a second low refractive index layer having an optical thickness of 135 to 196 nm.

5 Claims, 5 Drawing Sheets

(58) Field of Classification Search
CPC .. G02B 5/281; G02B 1/18; G02B 1/11; B32B 7/023
See application file for complete search history.

(56) References Cited

U.S. PATENT DOCUMENTS

| | | | |
|---|---|---|---|
| 2015/0322270 A1* | 11/2015 | Amin | C03C 21/002 428/141 |
| 2017/0197875 A1 | 7/2017 | Fujii et al. | |
| 2019/0310394 A1* | 10/2019 | Miyamoto | G02B 1/18 |
| 2019/0330054 A1 | 10/2019 | Ackermann et al. | |
| 2020/0018872 A1 | 1/2020 | Fujii et al. | |
| 2020/0103559 A1 | 4/2020 | Fujii et al. | |

FOREIGN PATENT DOCUMENTS

| | | |
|---|---|---|
| EP | 1 801 621 A2 | 6/2007 |
| EP | 1 972 966 A2 | 9/2008 |
| JP | H11-171596 A | 6/1999 |
| JP | H11-231127 A | 8/1999 |
| JP | 2002-243902 A | 8/2002 |
| JP | 2003-114302 A | 4/2003 |
| JP | 2004-258394 A | 9/2004 |
| JP | 2008-158145 A | 7/2008 |
| JP | 2017-049469 A | 3/2017 |
| JP | 2017-125876 A | 7/2017 |
| JP | 2019-53115 A | 4/2019 |
| JP | 2019-196301 A | 11/2019 |
| JP | 2020-56866 A | 4/2020 |
| JP | 2020-060657 A | 4/2020 |
| KR | 10-2019-0019069 A | 2/2019 |
| KR | 10-2019-0128736 A | 11/2019 |
| TW | 201936379 A | 9/2019 |
| TW | I781633 B | 10/2022 |
| WO | 2002/077704 A1 | 10/2002 |
| WO | 2019/107036 A1 | 6/2019 |
| WO | 2020/058186 A1 | 3/2020 |

OTHER PUBLICATIONS

Refractiveindex, Refractive Index of Nb2O5, https://refractiveindex.info/?shelf=main&book=Nb2O5&page=Lemarchand (Year: 2025).*
Aug. 10, 2022 Office Action issued in Chinese Patent Application No. 202180003487.7.
Nov. 28, 2023 Office Action issued in Japanese Patent Application No. 2022-124584.
Jul. 7, 2023 Office Action issued in Korean Patent Application No. 10-2021-7037599.
Aug. 17, 2023 Office Action issued in Chinese Patent Application No. 202180003487.7.
Apr. 17, 2024 Office Action Issued in Korean Patent Application No. 10-2024-7010153.
Oct. 13, 2022 Extended Search Report Issued in European Patent Application No. 21 807 916.8.
Nov. 7, 2023 Office Action issued in Korean Patent Application No. 10-2021-7037599.
Apr. 5, 2023 Office Action issued in Chinese Patent Application No. 202180003487.7.
Jul. 24, 2024 Office Action Issued in Japanese Patent Application No. 2024-007487.
Nov. 29, 2024 Office action issued in Taiwanese Patent Application No. 111136089.
Jan. 1, 19, 2022 Office Action issued in Taiwanese Patent Application No. 110118493.
Jul. 20, 2021 International Search Report issued in International Patent Application No. PCT/JP2021/018554.
Oct. 7, 2021 Office Action issued in Japanese Patent Application No. 2020-089189.

* cited by examiner

ANTIREFLECTION FILM

TECHNICAL FIELD

This technology relates to an antireflection film provided, for example, on the front surface of a display device. This application claims priority based on Japanese Patent Application No. 2020-089189, filed May 21, 2020, which is incorporated herein by reference.

BACKGROUND ART

There is a case in which an infrared (IR) sensor responsive to infrared rays is provided on the front surface of a display device. In this case, the antireflection film provided on the front surface of the display device preferably has a high infrared transmittance (see, for example, Patent Document 1). Furthermore, in recent years, there is a demand for antireflection films having excellent flexibility in order to cope with a foldable organic EL display or a so-called foldable display.

However, it has been difficult to achieve both of the high transmittance of infrared rays in the antireflection film and the reduction of the thickness of the antireflection film as much as possible.

CITATION LIST

Patent Literature

Patent Document 1: Japanese Unexamined Patent Application Publication No. 2019-53115

SUMMARY OF INVENTION

Technical Problem

This technology has been proposed in view of such conventional circumstances, and provides an antireflection film having high infrared transmittance and excellent flexibility.

Solution to Problem

The present technology provides an antireflection film having a hard coat layer, an adhesion layer, and an antireflection layer in this order on a base material, wherein, from the adhesion layer side, the antireflection layer includes: a first high refractive index layer having an optical thickness of 41 to 52 nm, a first low refractive index layer having an optical thickness of 41 to 53 nm, a second high refractive index layer having an optical thickness of 302 to 313 nm, and a second low refractive index layer having an optical thickness of 135 to 196 nm.

The present technology further provides an antireflection film having a hard coat layer, an adhesion layer, and an antireflection layer in this order on a base material, wherein, from the adhesion layer side, the antireflection layer includes a first high refractive index layer having an optical thickness of 23 to 35 nm a first low refractive index layer having an optical thickness of 66 to 81 nm, a second high refractive index layer having an optical thickness of 93 to 117 nm, a second low refractive index layer having an optical thickness of 37 to 52 nm, a third high refractive index layer having an optical thickness of 79 to 84 nm, and a third low refractive index layer having an optical thickness of 146 to 155 nm.

The present technology further provides a method for manufacturing an antireflection film, including steps of forming a hard coat layer, an adhesion layer, and an antireflection layer in this order on a base material, wherein, from the adhesion layer side, the antireflection layer includes a first high refractive index layer having an optical thickness of 41 to 52 nm, a first low refractive index layer having an optical thickness of 41 to 53 nm, a second high refractive index layer having an optical thickness of 302 to 313 nm, and a second low refractive index layer having an optical thickness of 135 to 196 nm.

The present technology further provides a method for manufacturing an antireflection film, including steps of forming a hard coat layer, an adhesion layer, and an antireflection layer in this order on a base material, wherein, from the adhesion layer side, the antireflection layer includes a first high refractive index layer having an optical thickness of 23 to 35 nm, a first low refractive index layer having an optical thickness of 66 to 81 nm, a second high refractive index layer having an optical thickness of 93 to 117 nm, a second low refractive index layer having an optical thickness of 37 to 52 nm, a third high refractive index layer having an optical thickness of 79 to 84 nm, and a third low refractive index layer having an optical thickness of 146 to 155 nm.

Advantageous Effects of Invention

According to the present technology, an antireflection film having high infrared transmittance and excellent flexibility can be obtained by making the number of antireflection layers be four or six.

DESCRIPTION OF EMBODIMENTS

Embodiments of the present technology will be described in detail below in the following order with reference to the drawings.
1. Antireflection Film
2. Method for Manufacturing Antireflection Film
3. Examples

1. Antireflection Film

Figure 1:
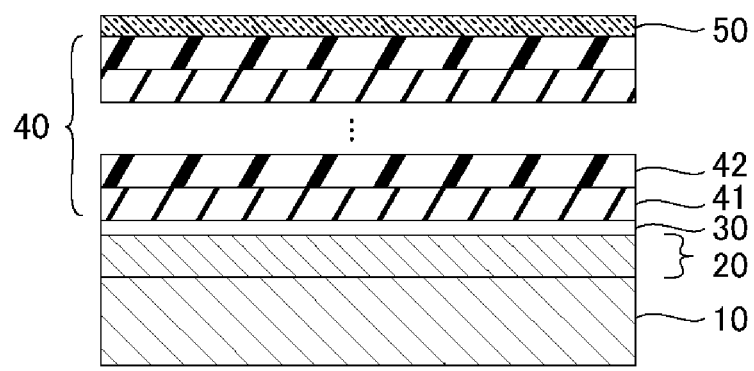
FIG. 1 is a cross-sectional view schematically illustrating an antireflection film according to the present technology.

FIG. 1 is a cross-sectional view schematically illustrating an antireflection film according to the present technology. As shown in FIG. 1, the antireflection film includes a base material 10, a hard coat layer 20, an adhesion layer 30, an antireflection layer 40, and optionally an antifouling layer 50.

The base material 10 includes, but is not limited to, PET (polyethylene terephthalate), a resin having an alicyclic structure in the main chain composed of a cycloolefin monomer (COP), a resin obtained by addition polymerization of a cyclic olefin (e.g. norbornenes) and an α-olefin (e.g. ethylene) (COC), TAC (triacetyl cellulose), PMMA (polymethyl methacrylate), PC (polycarbonate), as well as two types of polymer alloy films such as PC and PMMA, glass films (film-like glass), transparent polyimides, and polyamides, among others. The thickness of the base material 10 depends on the type and performance of the optical device to be used, but is typically 25 to 200 μm, preferably 40 to 150 μm.

The hard coat layer 20 exhibits a hardness of "H" or higher in a scratch hardness (pencil method) test measured in accordance with JIS K5600-5-4. Examples of the resin material of the hard coat layer 20 include an ultraviolet curable resin, an electron beam curable resin, a thermosetting resin, a thermoplastic resin, a two-liquid mixed resin, and an organic-inorganic hybrid resin, among other resins. Among these, it is preferable to use an ultraviolet curable resin capable of efficiently forming the hard coat layer 20 by ultraviolet irradiation.

Examples of the ultraviolet curable resin include acrylic resins, urethane resins, epoxy resins, polyester resins, amide resins, and silicone resins, among other resins.

Among these, it is preferable to use an acrylic resin capable of achieving a high transparency.

The acrylic ultraviolet curable resin is not particularly limited, and can be suitably selected and blended from two, three, or more functional acrylic monomers, oligomers, or polymer components in view of hardness, adhesion, and processability, among other factors. The hard coat layer 20 is preferably formed by photopolymerizing an ultraviolet curable resin containing a urethane (meth) acrylate oligomer, a (meth) acrylate monomer having three or more functional groups, a (meth) acrylate monomer having two functional groups, and a photopolymerization initiator. By using such a photocurable resin composition, the hard coat layer 20 having excellent hardness can be formed. The thickness of the hard coat layer 20 is usually 0.5 to 20 μm, preferably 1 to 15 μm, and more preferably 1 to 10 μm.

In the hard coat layer 20, metal oxide particles are preferably dispersed in the resin material, and the metal oxide particles are preferably projected to the adhesion layer 30 side. The average value of the projection ratio with respect to the average particle diameter of the metal oxide particles is preferably 60% or less, more preferably 10% or more and 30% or less. If the projection ratio of the metal oxide particles is too large, the metal oxide particles are easily peeled off from the hard coat layer 20, and the adhesion between the hard coat layer 20 and the adhesion layer 30 is degraded, and if the projection ratio is too small, the effect of improving the adhesion cannot be obtained. As a method for causing the metal oxide particles to project from the surface, for example, glow discharge treatment, plasma treatment, ion etching, alkali treatment, or the like can be used.

The metal oxide particle is a metal oxide particle, and the average particle diameter thereof is preferably 800 nm or less, more preferably 20 nm or more and 100 nm or less. If the average particle diameter of the metal oxide particles is too large, the optical characteristics are degraded, and if the average particle diameter is too small, the adhesion between the hard coat layer 20 and the adhesion layer 30 is degraded. It should be noted that, in this specification, the average particle diameter means a value measured by the BET method.

The content of the metal oxide particles with respect to the total solid content of the resin composition of the hard coat layer 20 is preferably 20 mass % or more and 50 mass % or less. If the content of the metal oxide particles is too small, the adhesion between the hard coat layer 20 and the adhesion layer 30 is degraded, and if the content is too large, the flexibility of the hard coat layer 20 is degraded. The solid content of the resin composition is all components other than the solvent, and a liquid monomer component is also included in the solid content.

Specific examples of the metal oxide particles include $SiO_2$ (silica), $Al_2O_3$ (alumina), $TiO_2$ (titania), $ZrO_2$ (zirconia), $CeO_2$ (ceria), MgO (magnesia), ZnO, $Ta_2O_5$, $Sb_2O_3$, $SnO_2$, and $MnO_2$, among others. Among these, it is preferable to use silica capable of achieving high transparency.

The adhesion layer 30 is preferably formed of an oxygen-deficient metal oxide. Examples of the oxygen-deficient metal oxide include $SiO_x$, $AlO_x$, $TiO_x$, $ZrO_x$, $CeO_x$, $MgO_x$, $ZnO_x$, $TaO_x$, $SbO_x$, $SnO_x$, and $MnO_x$. Here, the oxygen-deficient metal oxide refers to a metal oxide in a state where the number of oxygen is less than the stoichiometric composition. Examples of the metal include Si, Al, Ti, Zr, Ce, Mg, Zn, Ta, Sb, Sn, and Mn.

In the case where metal oxide particles are dispersed in the hard coat layer 20, it is preferably composed of an oxygen-deficient metal oxide having the same kind of metal as the metal oxide particles or the same kind of metal as the metal oxide particles. For example, when $SiO_2$ is used as the metal oxide particles, x in $SiO_x$ of the adhesion layer 30 is preferably 0 to 1.9. Further, the film thickness of the adhesion layer 30 is preferably smaller than 50% of the average particle diameter of the metal oxide particles exposed on the surface of the hard coat layer 20, more specifically, from 1 to 50 nm, more preferably from 1 to 30 nm, and still more preferably from 1 to 15 nm.

In order to cause the hard coat to have an antiglare property, translucent organic particles and translucent inorganic particles may be added. These particles are for imparting a light diffusion function and an antiglare function to the hard coat layer by forming surface irregularities. The translucent resin fine particles can be formed of a resin including a styrene-acrylic monomer copolymer resin (styrene-acrylic copolymer resin), a (meth) acrylic resin, a polystyrene resin, a polyethylene resin, a polycarbonate resin, and a vinyl chloride resin, among other resins.

In the antireflection layer 40, high refractive index layers 41 composed of a dielectric material and low refractive index layers 42 composed of a dielectric material having a refractive index lower than that of the high refractive index layers 41 are alternately deposited by sputtering. As will be described later, the number of layers of the antireflection layer 40 is preferably 4 or 6. When the number of layers in the antireflection layer 40 is 8 or more, the physical thickness of the antireflection layer 40 increases and the flexibility decreases. The thickness of the antireflection layer 40 is preferably 500 nm or less, more preferably 400 nm or less, and still more preferably 300 nm or less.

The antifouling layer 50 is a coating layer that imparts water repellency, oil repellency, sweat resistance, and antifouling properties, among others, to the surface of the antireflection film. As a material constituting the antifouling layer, for example, a fluorine-containing organic compound may be used. Examples of the fluorine-containing organic compound include fluorocarbons, perfluorosilanes, or polymer compounds thereof. For example, an alkoxysilane compound having a perfluoropolyether group used as the fluorine-containing organic compound exhibits water repellency with a water contact angle of 110 degrees or more, thereby improving antifouling properties. The film thickness of the antifouling layer 50 is preferably 1 to 10 nm, more preferably 1 to 7 nm, and still more preferably 2 to 5 nm.

The antireflection film having such a structure can achieve a high infrared transmittance. Specifically, the transmittance of light at a wavelength of 940 nm is preferably 90% or more, more preferably 92% or more. The reflectance of light at a wavelength of 940 nm is preferably 5% or less, and more preferably 4% or less.

Further, the antireflection film having the above-described structure can achieve excellent flexibility, and is suitable to a foldable display. Specifically, it is preferable to pass a bending test by the cylindrical mandrel method (according to JIS K5600-5-1) with the mandrel diameter of preferably 7 mm or less, more preferably 6 mm or less.

Further, the antireflection film having the above-described structure can achieve both of the high transmittance of infrared rays and the neutral color tone of reflected light, which have been difficult in the past. Specifically, the luminous reflectance Y is preferably 1.0% or less, and more preferably 0.5% or less. Also, the a* value in CIELAB is preferably 0 to 15, more preferably 0 to 10, and still more preferably 0 to 5. The b* value in CIELAB is preferably −18 to 0, more preferably −15 to 0, and still more preferably −10 to 0. When an anti-reflective film is placed on the top surface of the display, it is preferred that the color tone of the reflected light be neutral.

The antireflection film according to the present technology has a high infrared transmittance, excellent flexibility, and can make the color tone of reflected light neutral, so that it can be preferably applied to a display device such as a smartphone, a personal computer, or an on-vehicle display device in which an infrared (IR) sensor responding to infrared rays is installed on the front surface.

First Embodiment

The antireflection film according to a first embodiment is formed by laminating a hard coat layer, an adhesion layer, an antireflection layer, and an antifouling layer in this order on a base material. Since the base material, the hard coat layer, the adhesion layer, and the antifouling layer are the same as those of the base material 10, the hard coat layer 20, the adhesion layer 30, and the antifouling layer 50, the description thereof is omitted here.

Figure 2:
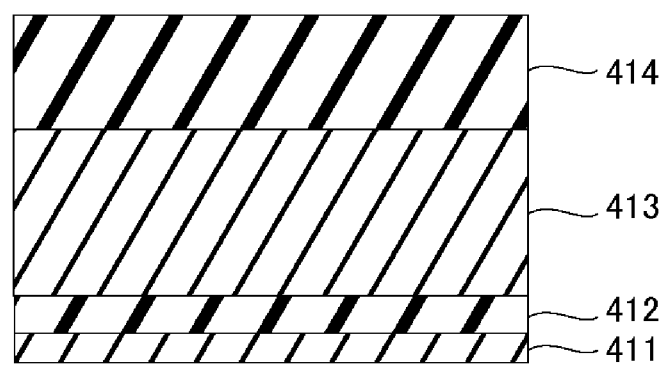
FIG. 2 is a cross-sectional view schematically illustrating an antireflection layer in an antireflection film according to a first embodiment.

FIG. 2 is a cross-sectional view schematically illustrating an antireflection layer in the antireflection film according to the first embodiment. As shown in FIG. 2, the antireflection layer according to the first embodiment comprises, from the adhesion layer 30 side, a first high refractive index layer 411 having an optical thickness of 41 to 52 nm, a first low refractive index layer 412 having an optical thickness of 41 to 53 nm, a second high refractive index layer 413 having an optical thickness of 302 to 313 nm, and a second low refractive index layer 414 having an optical thickness of 135 to 196 nm.

As used herein, "optical thickness" is the product of physical thickness and refractive index. Refractive index is measured in accordance with JIS K7105 at a temperature of 25° C. and a wavelength of 550 nm. The "physical thickness" can be determined by, for example, measuring thicknesses of 20 portions in an image of a cross section taken by using a transmission electron microscope (TEM) or a scanning transmission electron microscope (STEM), and calculating the average value of the thicknesses of 20 portions.

The reflection wavelength and the reflectance of the antireflection film can be designed by, for example, the optical thickness of the high refractive index layer and the low refractive index layer, the total number of the high refractive index layer and the low refractive index layer, and the refractive index difference between the high refractive index layer and the low refractive index layer.

The refractive index of the high refractive index layer is preferably 2.00 to 2.60, and more preferably 2.10 to 2.45. Main components of the high refractive index layer include niobium pentoxide ($Nb_2O_5$, refractive index 2.33), titanium oxide ($TiO_2$, refractive index 2.33 to 2.55), tungsten oxide ($WO_3$, refractive index 2.2), cerium oxide ($CeO_2$, refractive index 2.2), tantalum pentoxide ($Ta_2O_5$, refractive index 2.16), zinc oxide (ZnO, refractive index 2.1), indium oxide ($InO_2$), tin oxide ($SnO_2$), aluminum oxide ($AlO_2$), and composite oxides thereof. Examples of the composite oxide include ITO (indium tin oxide) and IZO (indium oxide-zinc oxide). The term "main component" as used herein refers to a component having the highest content, for example, a content of 80% or more.

The refractive index of the low refractive index layer is preferably 1.20 to 1.60, and more preferably 1.30 to 1.50. The main components of the low refractive index layer include silicon dioxide ($SiO_2$, refractive index 1.46), calcium fluoride ($CaF_2$, refractive index 1.42), and magnesium fluoride ($MgF_2$, refractive index 1.38), among others. Other elements may be included as long as the refractive index of the low refractive index layer falls within the above range. Specifically, the chemical resistance can be improved by adding about 10% of zirconium in the element ratio. As another example, the film may be formed by introducing $N_2$ gas at the time of film formation in order to improve the hardness. Further, in order to improve the optical characteristics, a metal element such as Al may be added.

The difference between the refractive index of the high refractive index layer and the refractive index of the low refractive index layer is preferably 0.40 to 1.40, and more preferably 0.70 to 1.10. Examples of the combination of such a high refractive index layer and a low refractive index layer include $Nb_2O_5/SiO_2$, and $TiO_2/SiO_2$.

In the antireflection layer according to the first embodiment shown in FIG. 2, when the first high refractive index layer 411 contains $Nb_2O_5$ as a main component, the physical thickness is preferably 18 to 22 nm; when the first low refractive index layer 412 contains $SiO_2$ as a main component, the physical thickness is preferably 28 to 36 nm; when the second high refractive index layer 413 contains $Nb_2O_5$ as a main component, the physical thickness is preferably 130 to 134 nm; and when the second low refractive index layer 414 contains $SiO_2$ as a main component, the physical thickness is preferably 92 to 95 nm.

This antireflection layer can achieve a high infrared transmittance. Specifically, the transmittance of light at a wavelength of 940 nm is preferably 90% or more, more preferably 92% or more. The reflectance of light at a wavelength of 940 nm is preferably 5% or less, and more preferably 4% or less.

Further, by using $Nb_2O_5$ as a main component of the high refractive index layer and $SiO_2$ as a main component of the low refractive index layer, since the total physical thickness of each layer is 300 nm or less, it is possible to obtain excellent flexibility and to be used in foldable displays.

Specifically, it is preferable to pass a bending test by the cylindrical mandrel method (according to JIS K5600-5-1) with the mandrel diameter of preferably 7 mm or less, more preferably 6 mm or less.

Further, by using $Nb_2O_5$ as the main component of the high refractive index layer and $SiO_2$ as the main component of the low refractive index layer, it is possible to achieve both of the high transmittance of infrared rays and the neutral color tone of reflected light. Specifically, the luminous reflectance Y is preferably 0.5% or less, and more preferably 0.4% or less. Also, the a* value in CIELAB is preferably 0 to 15, more preferably 0 to 10, and still more preferably 0 to 5. The b* value in CIELAB is preferably −15 to 0, more preferably −12 to 0, and still more preferably −10 to 0.

The antireflection film according to the first embodiment can provide a high infrared transmittance and excellent flexibility by using the antireflection layer having a 4-layer structure. In addition, in the antireflection layer having a 4-layer structure, it is possible to achieve both of the high transmittance of infrared rays and the neutral color tone of reflected light, thereby achieving high productivity.

Second Embodiment

As in the first embodiment, the antireflection film according to the second embodiment is formed by laminating a hard coat layer, an adhesion layer, an antireflection layer, and an antifouling layer in this order on a base material. Since the base material, the hard coat layer, the adhesion layer, and the antifouling layer are the same as those of the base material 10, the hard coat layer 20, the adhesion layer 30, and the antifouling layer 50, the description thereof is omitted here.

Figure 3:
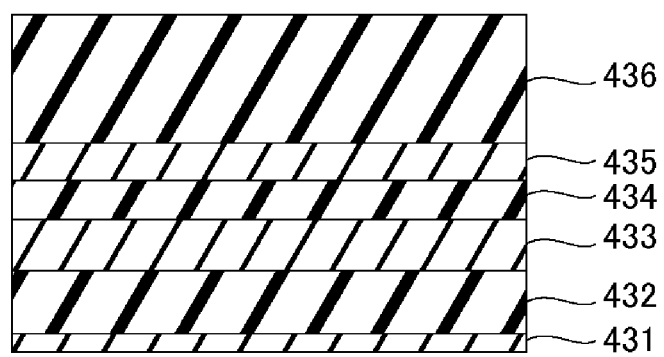
FIG. 3 is a cross-sectional view schematically illustrating an antireflection layer in an antireflection film according to a second embodiment.

FIG. 3 is a cross-sectional view schematically illustrating an antireflection layer in the antireflection film according to the second embodiment. As shown in FIG. 3, the antireflection layer according to the second embodiment comprises, from the adhesion layer side, a first high refractive index layer 431 having an optical thickness of 23 to 35 nm, a first low refractive index layer 432 having an optical thickness of 66 to 81 nm, a second high refractive index layer 433 having an optical thickness of 93 to 117 nm, a second low refractive index layer 434 having an optical thickness of 37 to 52 nm, a third high refractive index layer 435 having an optical thickness of 79 to 84 nm, and a third low refractive index layer 436 having an optical thickness of 146 to 155 nm.

The refractive index of the high refractive index layer, the dielectric material of the high refractive index layer, the refractive index of the low refractive index layer, the dielectric material of the low refractive index layer, and the difference between the refractive index of the high refractive index layer and the refractive index of the low refractive index layer are the same as in the first embodiment.

In the antireflection layer according to the second embodiment, when the first high refractive index layer 431 contains $Nb_2O_5$ as a main component, the physical thickness is preferably 10 to 15 nm; when the first low refractive index layer 432 contains $SiO_2$ as a main component, the physical thickness is preferably 45 to 55 nm; when the second high refractive index layer 433 contains $Nb_2O_5$ as a main component, the physical thickness is preferably 40 to 50 nm; when the second low refractive index layer 434 contains $SiO_2$ as a main component, the physical thickness is preferably 25 to 35 nm; when the third high refractive index layer 435 contains $Nb_2O_5$ as a main component, the physical thickness is preferably 30 to 36 nm; and when the third low refractive index layer 436 contains $SiO_2$ as a main component, the physical thickness is preferably 100 to 106 nm.

This antireflection layer can achieve a high infrared transmittance. Specifically, the transmittance of light at a wavelength of 940 nm is preferably 90% or more, more preferably 92% or more. The reflectance of light at a wavelength of 940 nm is preferably 5% or less, and more preferably 4% or less.

Further, by using $Nb_2O_5$ as a main component of the high refractive index layer and $SiO_2$ as a main component of the low refractive index layer, since the total physical thickness of each layer is 300 nm or less, it is possible to obtain excellent flexibility and to be used in foldable displays. Specifically, it is preferable to pass a bending test by the cylindrical mandrel method (according to JIS K5600-5-1) with the mandrel diameter of preferably 7 mm or less, more preferably 6 mm or less.

Furthermore, by using $Nb_2O_5$ as the main component of the high refractive index layer and $SiO_2$ as the main component of the low refractive index layer, it is possible to achieve both of the high transmittance of infrared rays and the neutral color tone of reflected light. Specifically, the luminous reflectance Y is preferably 1.0% or less, and more preferably 0.8% or less. Also, the a* value in CIELAB is preferably 0 to 15, more preferably 0 to 10, and still more preferably 0 to 5. The b* value in CIELAB is preferably −18 to 0, more preferably −10 to 0.

The antireflection film according to the second embodiment can provide a high infrared transmittance and excellent flexibility by using the antireflection layer having a 6-layer structure. In addition, in the antireflection layer having a 6-layer structure, it is possible to achieve both of the high transmittance of infrared rays and the neutral color tone of reflected light, thereby achieving high productivity.

2. Method for Manufacturing Antireflection Film

In the method for manufacturing an antireflection film according to the present embodiment, a hard coat layer, an adhesion layer, and an antireflection layer are formed on a base material in this order. If necessary, the antifouling layer 50 may be formed on the antireflection layer. Since the base material, the hard coat layer, the adhesion layer, and the antifouling layer are the same as those of the base material 10, the hard coat layer 20, the adhesion layer 30, and the antifouling layer 50, the description thereof is omitted here. Hereinafter, film formation of each layer will be described.

Formation of Hard Coat Layer

First, an ultraviolet curable resin composition containing, for example, metal oxide particles, a urethane (meth) acrylate oligomer, a (meth) acrylate monomer having three or more functional groups, a (meth) acrylate monomer having two functional groups, and a photopolymerization initiator is prepared by uniformly mixing the composition according to a conventional method using a stirrer such as a disper.

Next, an ultraviolet curable resin composition is coated on the base material. The coating method is not particularly limited, and any known method can be used. Known coating methods include, for example, a microgravure coating method, a wire bar coating method, a direct gravure coating method, a die coating method, a dip method, a spray coating method, a reverse roll coating method, a curtain coating method, a comma coating method, a knife coating method, and a spin coating method, among other methods.

Next, the ultraviolet curable resin composition on the base material is dried and photocured to form a hard coat layer. The drying conditions are not particularly limited, and may be natural drying or artificial drying for adjusting the drying humidity, and drying time, among other conditions. However, when the surface of the coating material is exposed to air during drying, it is preferable that no wind pattern is generated on the surface of the coating film. This is because the wind pattern will deteriorate the appearance of the coating and make the thickness of the surface uneven. As the light for curing the ultraviolet curable resin composition, energy rays such as gamma rays, alpha rays, and electron beams may be applied in addition to ultraviolet rays.

Here, the surface of the hard coat layer is preferably etched to cause metal oxide particles to project from the surface. The method for causing the metal oxide particles to project from the surface is not particularly limited as long as the resin of the hard coat layer can be selectively etched, and for example, glow discharge treatment, plasma treatment, ion etching, and alkali treatment, among other treatments can be used. Among these, it is preferable to use a glow discharge treatment capable of large-area processing.

Formation of Adhesion Layer

An adhesion layer composed of a metal oxide in an oxygen deficient state is formed on the surface of the hard coat layer. As the film forming method of the adhesion layer, sputtering method using a target is preferably used. For example, when an $SiO_x$ film is formed, it is preferable to use a silicon target and to use reactive sputtering in a mixed gas atmosphere of oxygen gas and argon gas. Further, since the antireflection layer formed on the adhesion layer can also be formed by sputtering, productivity can be improved.

Formation of Antireflection Layer

In the film formation of the antireflection layer, a high refractive index layer composed of a dielectric material and a low refractive index layer composed of a dielectric material having a refractive index lower than that of the high refractive index layer are alternately formed by sputtering. For forming the antireflection layer, for example, the thin film forming apparatus described in Japanese Unexamined Patent Application Publication No. 2014-034701 can be used.

Figure 4:
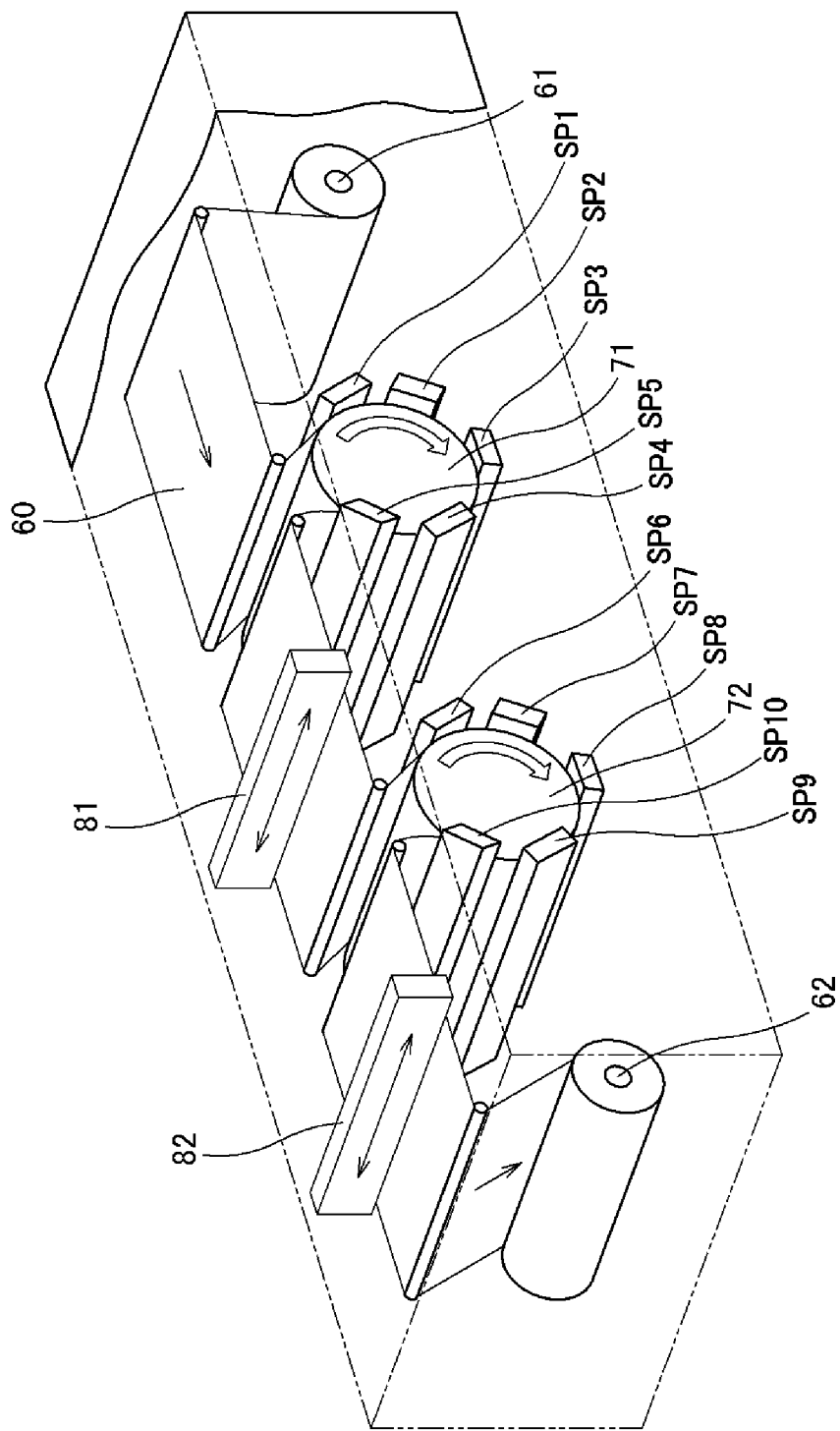
FIG. 4 is a perspective view schematically illustrating a thin film forming apparatus.

FIG. 4 is a perspective view schematically illustrating a thin film forming apparatus. In this thin film forming apparatus, a base film 60 is supplied from an unwinding roll 61 functioning as an unwinding part, and an antireflection film having an antireflection layer formed thereon is wound by a winding roll 62 functioning as a winding part. Here, the base film 60 can be a film after hard coat layer formation or a film after adhesion layer formation.

A first film formation chamber unit and a second film formation chamber unit functioning as film formation units are provided in a vacuum chamber. The vacuum chamber is connected to a vacuum pump for discharging air and can be adjusted to a predetermined degree of vacuum.

The first film formation chamber unit and the second film formation chamber unit are respectively provided with a first can roll 71 and a second can roll 72, and a plurality of sputtering chambers SP1 to SP10 functioning as film formation parts are fixed so as to face the outer peripheral surfaces of the can rolls 71, 72. In each of the sputtering chambers SP1 to SP10, a predetermined target is mounted on the electrode, and a supply part having a plurality of gas nozzles in the width direction of the base film 60 is provided.

In addition, the thin film forming apparatus is provided with a first optical monitor 81 between the first film forming chamber unit and the second film forming chamber unit for measuring optical characteristics after film formation by the sputtering chamber SP5. Thus, it is possible to confirm the quality of the thin film of the intermediate product after the first film formation chamber unit. In addition, the thin film forming apparatus is further provided with a second optical monitor 82 after the second film formation chamber unit for measuring optical characteristics after film formation by the sputtering chamber SP10. Thus, it is possible to confirm the quality of the thin film after the second film formation chamber unit.

The first optical monitor 81 and the second optical monitor 82 measure optical characteristics in the width direction of a thin film formed on the base film 60 by an optical head capable of scanning in the width direction. The optical monitors 81, 82 measure, for example, the peak wavelength of reflectance as an optical characteristic and convert it into an optical thickness, thereby obtaining an optical thickness distribution in the width direction.

The thin film forming apparatus having such a constitution can produce a multilayer antireflection layer by feeding the base film 60 from the unwinding roll 61, forming a thin film on the base film 60 conveyed by the first can roll 71 and the second can roll 72, and winding the thin film by the winding roll 62. Here, by measuring optical characteristics in the width direction of the thin film formed on the base film 60 with the optical monitors 81, 82, and controlling the flow rate of the reactive gas supplied from each gas nozzle provided in the width direction based on the optical characteristics, it is possible to form a thin film having a uniform thickness in the longitudinal direction and the width direction. It should be noted that the present technology is not limited to the above example, and a film-forming chamber unit may be added, a cathode may be added, and a planer, a rotary, or the like may be used for the cathode system in order to improve productivity.

Formation of Antifouling Layer

The antifouling layer may be formed by physical vapor deposition, chemical vapor deposition, wet coating, or the like, depending on the material to be formed. For example, by applying and drying an alkoxysilane compound having a perfluoropolyether group, the alkoxysilane compound having a perfluoropolyether group can be condensed to form the antifouling layer.

EXAMPLES

3. First Examples

In the first examples, antireflection films were prepared, and the luminous reflectance Y, the reflection hue, the infrared transmittance, the infrared reflectance, and the flexibility were evaluated. The present technology is not limited to these examples.

Luminous Reflectance Y

The antireflection films were cut into a 50 mm square size to prepare evaluation samples. The evaluation samples were pasted to a black acrylic plate via adhesive and the spectral reflectance (wavelength: 380 to 1,000 nm, angle of incidence: 5°) was measured using a spectrophotometer (U4150, manufactured by Hitachi High-Tech). The back side of the sample was blackened to cancel reflections from the back side and reflections only from the front surface were measured. The measured spectral reflectance and the relative spectral distribution of the CIE standard illuminant D65 were used to calculate the luminous reflectance Y (tristimulus value Y) of the object color as the result of the reflection in the XYZ color system specified in JIS Z8701.

Reflection Hue

Based on the XYZ color system obtained in the process of calculating the luminous reflectance Y, a* and b* in the CIE-Lab color system were obtained by conversion according to the following formula.

$$a^* = 500\left[f\left(\frac{X}{X_n}\right) - f\left(\frac{Y}{Y_n}\right)\right] \quad \text{[Formula 1]}$$

$$b^* = 500\left[f\left(\frac{Y}{Y_n}\right) - f\left(\frac{Z}{Z_n}\right)\right]$$

The color tones in which a* is 0 or more and 15 or less and b* is −20 or more and 0 or less were evaluated as "GOOD" and the other color tones were evaluated as "BAD".

Infrared Transmittance and Infrared Reflectance

The transmission spectrum and the reflection spectrum of the antireflection film were measured using a spectrophotometer (U4150, manufactured by Hitachi High-Tech), and the transmittance and the reflectance at a wavelength of 940 nm were determined.

Flexibility

A bending test was carried out by a cylindrical mandrel method (according to JIS K5600-5-1) in which bending was carried out for test pieces of the antireflection film with the antireflection layer side facing outward. For the evaluation of the flexibility, the samples without cracks in the test using mandrel diameters of 6 mm or less were evaluated as "GOOD" and the samples with cracks in the test using mandrel diameters of more than 6 mm were evaluated as "BAD". The samples can be used for a so-called foldable display as long as there are no cracks in the test using mandrel diameters of 7 mm or less.

Example 1

TAC having a thickness of 80 μm is used as the base material, and a hard coat layer composed of an acrylic resin layer having a thickness of 5 μm was formed on the TAC. The hard coat layer is formed by photopolymerizing an ultraviolet curable resin containing a urethane (meth) acrylate oligomer, a (meth) acrylate monomer having three or more functional groups, a (meth) acrylate monomer having two functional groups, and a photopolymerization initiator. An adhesion layer composed of $SiO_x$ having a thickness of 3 nm was formed on the hard coat layer by sputtering, and an antireflection layer was formed by alternately laminating a high refractive index layer and a low refractive index layer on the adhesion layer by using a thin film forming apparatus. Further, an antifouling layer having a thickness of 3 nm composed of an alkoxysilane compound having a perfluoropolyether group was formed on the antireflection layer to prepare the antireflection film of Example 1.

The antireflection layer had a 4-layer structure of a total thickness of 277 nm, which was composed of, from the adhesion layer side, a first high refractive index layer composed of $Nb_2O_5$ having a physical thickness of 20 nm, a first low refractive index layer composed of $SiO_2$ having a physical thickness of 32 nm, a second high refractive index layer composed of $Nb_2O_5$ having a physical thickness of 131 nm, and a second low refractive index layer composed of $SiO_2$ having a physical thickness of 94 nm.

As shown in Table 1, the luminous reflectance Y of the antireflection film was 0.39, the a* in the CIE-Lab color system was 1.4 and the b* was −9.1, so that the color tone was evaluated as GOOD, the infrared transmittance was 92.9%, and the infrared reflectance was 3.1%. In the mandrel test, no crack was observed when the mandrel diameter was 6 mm, and a crack was observed when the mandrel diameter was 5 mm, so that the flexibility was evaluated as GOOD.

Figure 5:
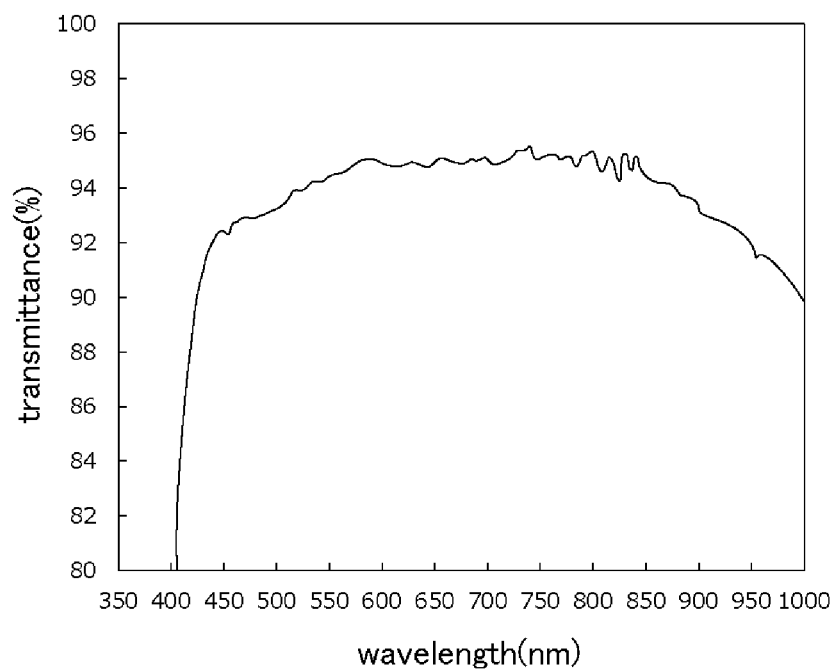
FIG. 5 is a graph showing the transmission spectrum of the antireflection film of Example 1.
Figure 6:
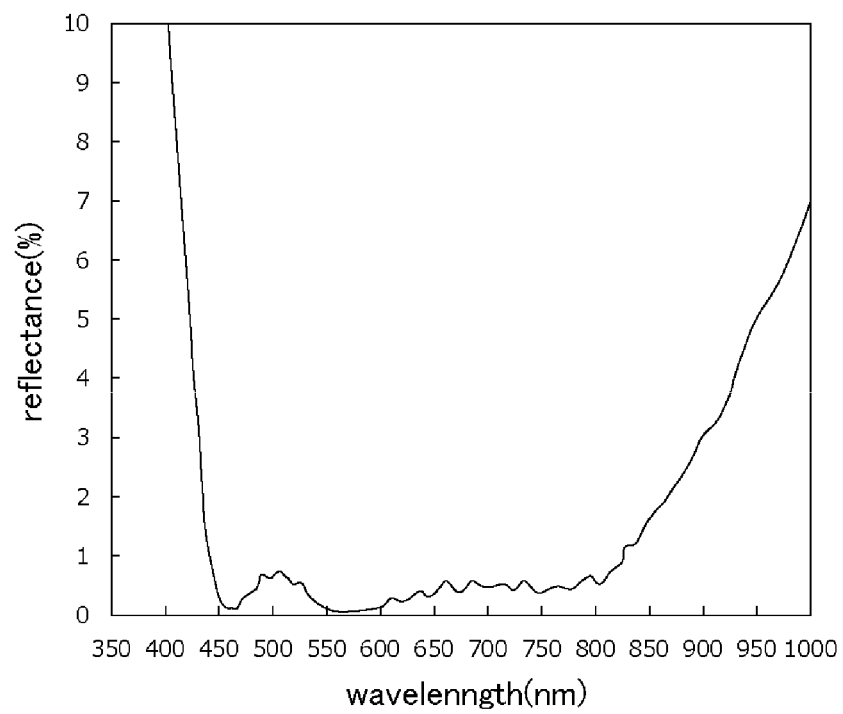
FIG. 6 is a graph showing the reflection spectrum of the antireflection film of Example 1.

FIG. 5 is a graph showing the transmission spectrum of the antireflection film of Example 1, and FIG. 6 is a graph showing the reflection spectrum of the antireflection film of Example 1. It can be seen that the antireflection film of Example 1 has a transmittance of 90% or more and a reflectance of 5% or less over a wavelength range of 450 to 950 nm.

Example 2

An antireflection film was prepared in the same manner as in Example 1, except that the antireflection layer had a 4-layer structure of a total thickness of 276 nm, which was composed of, from the adhesion layer side, a first high refractive index layer composed of $Nb_2O_5$ having a physical thickness of 19 nm, a first low refractive index layer composed of $SiO_2$ having a physical thickness of 32 nm, a second high refractive index layer composed of $Nb_2O_5$ having a physical thickness of 132 nm, and a second low refractive index layer composed of $SiO_2$ having a physical thickness of 93 nm.

As shown in Table 1, the luminous reflectance Y of the antireflection film was 0.26, the a* in the CIE-Lab color system was 4.1, the b* was −7.6, the infrared transmittance was 91.9%, and the infrared reflectance was 4.3%. In the mandrel test, no crack was observed when the mandrel diameter was 6 mm, and a crack was observed when the mandrel diameter was 5 mm, so that the flexibility was evaluated as GOOD.

Example 3

An antireflection film was prepared in the same manner as in Example 1, except that the antireflection layer had a 4-layer structure of a total thickness of 282 nm, which was composed of, from the adhesion layer side, a first high refractive index layer composed of $Nb_2O_5$ having a physical thickness of 22 nm, a first low refractive index layer composed of $SiO_2$ having a physical thickness of 32 nm, a second high refractive index layer composed of $Nb_2O_5$ having a physical thickness of 134 nm, and a second low refractive index layer composed of $SiO_2$ having a physical thickness of 94 nm.

As shown in Table 1, the luminous reflectance Y of the antireflection film was 0.34, the a* in the CIE-Lab color system was 4.6, the b* was −8.3, the infrared transmittance was 93.3%, and the infrared reflectance was 3.5%. In the mandrel test, no crack was observed when the mandrel diameter was 6 mm, and a crack was observed when the mandrel diameter was 5 mm, so that the flexibility was evaluated as GOOD.

Example 4

An antireflection film was prepared in the same manner as in Example 1, except that the antireflection layer had a 4-layer structure of a total thickness of 275 nm, which was composed of, from the adhesion layer side, a first high refractive index layer composed of $Nb_2O_5$ having a physical thickness of 20 nm, a first low refractive index layer composed of $SiO_2$ having a physical thickness of 32 nm, a second high refractive index layer composed of $Nb_2O_5$ having a physical thickness of 130 nm, and a second low refractive index layer composed of $SiO_2$ having a physical thickness of 93 nm.

As shown in Table 1, the luminous reflectance Y of the antireflection film was 0.29, the a* in the CIE-Lab color system was 2.1, the b* was −6.8, the infrared transmittance was 91.8%, and the infrared reflectance was 4.1%. In the mandrel test, no crack was observed when the mandrel diameter was 6 mm, and a crack was observed when the mandrel diameter was 5 mm, so that the flexibility was evaluated as GOOD.

Example 5

An antireflection film was prepared in the same manner as in Example 1, except that the antireflection layer had a 4-layer structure of a total thickness of 278 nm, which was composed of, from the adhesion layer side, a first high refractive index layer composed of $Nb_2O_5$ having a physical thickness of 18 nm, a first low refractive index layer composed of $SiO_2$ having a physical thickness of 32 nm, a second high refractive index layer composed of $Nb_2O_5$ having a physical thickness of 134 nm, and a second low refractive index layer composed of $SiO_2$ having a physical thickness of 94 nm.

As shown in Table 1, the luminous reflectance Y of the antireflection film was 0.34, the a* in the CIE-Lab color system was 13.0, the b* was −13.9, the infrared transmittance was 91.8%, and the infrared reflectance was 4.1%. In the mandrel test, no crack was observed when the mandrel diameter was 6 mm, and a crack was observed when the mandrel diameter was 5 mm, so that the flexibility was evaluated as GOOD.

Example 6

An antireflection film was prepared in the same manner as in Example 1, except that the antireflection layer had a 4-layer structure of a total thickness of 278 nm, which was composed of, from the adhesion layer side, a first high refractive index layer composed of $Nb_2O_5$ having a physical thickness of 19 nm, a first low refractive index layer composed of $SiO_2$ having a physical thickness of 32 nm, a second high refractive index layer composed of $Nb_2O_5$ having a physical thickness of 133 nm, and a second low refractive index layer composed of $SiO_2$ having a physical thickness of 94 nm.

As shown in Table 1, the luminous reflectance Y of the antireflection film was 0.28, the a* in the CIE-Lab color system was 8.9, the b* was −13.9, the infrared transmittance was 93.3%, and the infrared reflectance was 3.0%. In the mandrel test, no crack was observed when the mandrel diameter was 6 mm, and a crack was observed when the mandrel diameter was 5 mm, so that the flexibility was evaluated as GOOD.

Example 7

An antireflection film was prepared in the same manner as in Example 1, except that the antireflection layer had a 4-layer structure of a total thickness of 276 nm, which was composed of, from the adhesion layer side, a first high refractive index layer composed of $Nb_2O_5$ having a physical thickness of 19 nm, a first low refractive index layer composed of $SiO_2$ having a physical thickness of 32 nm, a second high refractive index layer composed of $Nb_2O_5$ having a physical thickness of 131 nm, and a second low refractive index layer composed of $SiO_2$ having a physical thickness of 94 nm.

As shown in Table 1, the luminous reflectance Y of the antireflection film was 0.32, the a* in the CIE-Lab color system was 7.7, and the b* was −8.8, and the color tone was evaluated as GOOD, the infrared transmittance was 95.0%, and the infrared reflectance was 4.6%. In the mandrel test, no crack was observed when the mandrel diameter was 6 mm, and a crack was observed when the mandrel diameter was 5 mm, so that the flexibility was evaluated as GOOD.

Example 8

An antireflection film was prepared in the same manner as in Example 1, except that the antireflection layer had a 6-layer structure of a total thickness of 274 nm, which was composed of, from the adhesion layer side, a first high refractive index layer composed of $Nb_2O_5$ having a physical thickness of 13.7 nm, a first low refractive index layer composed of $SiO_2$ having a physical thickness of 49 nm, a second high refractive index layer composed of $Nb_2O_5$ having a physical thickness of 44 nm, a second low refractive index layer composed of $SiO_2$ having a physical thickness of 30.3 nm, a third high refractive index layer composed of $Nb_2O_5$ having a physical thickness of 34 nm, and a third low refractive index layer composed of $SiO_2$ having a physical thickness of 103 nm.

As shown in Table 2, the luminous reflectance Y of the antireflection film was 0.66, the a* in the CIE-Lab color system was 6.6, the b* was −15.8, the infrared transmittance was 92.7%, and the infrared reflectance was 2.1%. In the mandrel test, no crack was observed when the mandrel diameter was 6 mm, and a crack was observed when the mandrel diameter was 5 mm, so that the flexibility was evaluated as GOOD.

Example 9

An antireflection film was prepared in the same manner as in Example 1, except that the antireflection layer had a 6-layer structure of a total thickness of 272.3 nm, which was composed of, from the adhesion layer side, a first high refractive index layer composed of $Nb_2O_5$ having a physical thickness of 12 nm, a first low refractive index layer composed of $SiO_2$ having a physical thickness of 49 nm, a second high refractive index layer composed of $Nb_2O_5$ having a physical thickness of 44 nm, a second low refractive index layer composed of $SiO_2$ having a physical thickness of 30.3 nm, a third high refractive index layer composed of $Nb_2O_5$ having a physical thickness of 34 nm, and a third low refractive index layer composed of $SiO_2$ having a physical thickness of 103 nm.

As shown in Table 2, the luminous reflectance Y of the antireflection film was 0.96, the a* in the CIE-Lab color system was 12.6, the b* was −15.3, the infrared transmittance was 93.1%, and the infrared reflectance was 3.3%. In the mandrel test, no crack was observed when the mandrel diameter was 6 mm, and a crack was observed when the mandrel diameter was 5 mm, so that the flexibility was evaluated as GOOD.

Example 10

An antireflection film was prepared in the same manner as in Example 1, except that the antireflection layer had a 6-layer structure of a total thickness of 270 nm, which was composed of, from the adhesion layer side, a first high refractive index layer composed of $Nb_2O_5$ having a physical thickness of 13.7 nm, a first low refractive index layer composed of $SiO_2$ having a physical thickness of 49 nm, a second high refractive index layer composed of $Nb_2O_5$ having a physical thickness of 44 nm, a second low refractive index layer composed of $SiO_2$ having a physical thickness of 30.3 nm, a third high refractive index layer composed of $Nb_2O_5$ having a physical thickness of 32 nm, and a third low refractive index layer composed of $SiO_2$ having a physical thickness of 101 nm.

As shown in Table 2, the luminous reflectance Y of the antireflection film was 0.74, the a* in the CIE-Lab color system was 4.1, the b* was −9.5, the infrared transmittance was 92.1%, and the infrared reflectance was 4.9%. In the mandrel test, no crack was observed when the mandrel diameter was 6 mm, and a crack was observed when the mandrel diameter was 5 mm, so that the flexibility was evaluated as GOOD.

Comparative Example 1

An antireflection film was prepared in the same manner as in Example 1, except that the antireflection layer had a 10-layer structure of a total thickness of 654 nm, which was composed of, from the adhesion layer side, a first high refractive index layer composed of $Nb_2O_5$ having a physical thickness of 14 nm, a first low refractive index layer composed of $SiO_2$ having a physical thickness of 32 nm, a second high refractive index layer composed of $Nb_2O_5$ having a physical thickness of 130 nm, a second low refractive index layer composed of $SiO_2$ having a physical thickness of 35 nm, a third high refractive index layer composed of $Nb_2O_5$ having a physical thickness of 18 nm, a third low refractive index layer composed of $SiO_2$ having a physical thickness of 230 nm, a fourth high refractive index layer composed of $Nb_2O_5$ having a physical thickness of 25 nm, a fourth low refractive index layer composed of $SiO_2$ having a physical thickness of 33 nm, and a fifth high refractive index layer composed of $Nb_2O_5$ having a physical thickness of 37 nm, a fifth low refractive index layer composed of $SiO_2$ having a physical thickness of 100 nm.

As shown in Table 2, the luminous reflectance Y of the antireflection film was 0.34, the a* in the CIE-Lab color system was −2.6 and the b* was −2.8, so that the color tone was evaluated as BAD, and the transmittance of infrared rays was 96.6% and the reflectance of infrared rays was 2.9%. In the mandrel test, no crack was observed when the mandrel diameter was 10 mm, and a crack was observed when the mandrel diameter was 8 mm, so that the flexibility was evaluated as BAD.

Comparative Example 2

An antireflection film was prepared in the same manner as in Example 1, except that the antireflection layer had an 8-layer structure of a total thickness of 356 nm, which was composed of, from the adhesion layer side, a first high refractive index layer composed of $Nb_2O_5$ having a physical thickness of 7 nm, a first low refractive index layer composed of $SiO_2$ having a physical thickness of 35 nm, a second high refractive index layer composed of $Nb_2O_5$ having a physical thickness of 12 nm, a second low refractive index layer composed of $SiO_2$ having a physical thickness of 25 nm, a third high refractive index layer composed of $Nb_2O_5$ having a physical thickness of 34 nm, a third low refractive index layer composed of $SiO_2$ having a physical thickness of 23 nm, a fourth high refractive index layer composed of $Nb_2O_5$ having a physical thickness of 129 nm, and a fourth low refractive index layer composed of $SiO_2$ having a physical thickness of 91 nm.

As shown in Table 2, the luminous reflectance Y of the antireflection film was 0.54, the a* in the CIE-Lab color system was −3.0 and the b* was −3.8, so that the color tone was evaluated as BAD, and the transmittance of infrared rays was 94.5%, and the reflectance of infrared rays was 5.2%. In the mandrel test, no crack was observed when the mandrel diameter was 8 mm, and a crack was observed when the mandrel diameter was 6 mm, so that the flexibility was evaluated as BAD.

Comparative Example 3

An antireflection film was prepared in the same manner as in Example 1, except that the antireflection layer had a 6-layer structure of a total thickness of 337 nm, which was composed of, from the adhesion layer side, a first high refractive index layer composed of $Nb_2O_5$ having a physical thickness of 13 nm, a first low refractive index layer composed of $SiO_2$ having a physical thickness of 41 nm, a second high refractive index layer composed of $Nb_2O_5$ having a physical thickness of 37 nm, a second low refractive index layer composed of $SiO_2$ having a physical thickness of 22 nm, a third high refractive index layer composed of $Nb_2O_5$ having a physical thickness of 131 nm, and a third low refractive index layer composed of $SiO_2$ having a physical thickness of 93 nm.

As shown in Table 2, the luminous reflectance Y of the antireflection film was 0.58, the a* in the CIE-Lab color system was −0.5 and the b* was −6.6, so that the color tone was evaluated as BAD, and the transmittance of infrared rays was 89.7%, and the reflectance of infrared rays was 4.1%. In the mandrel test, no crack was observed when the mandrel diameter was 8 mm, and a crack was observed when the mandrel diameter was 6 mm, so that the flexibility was evaluated as BAD.

Figure 7:
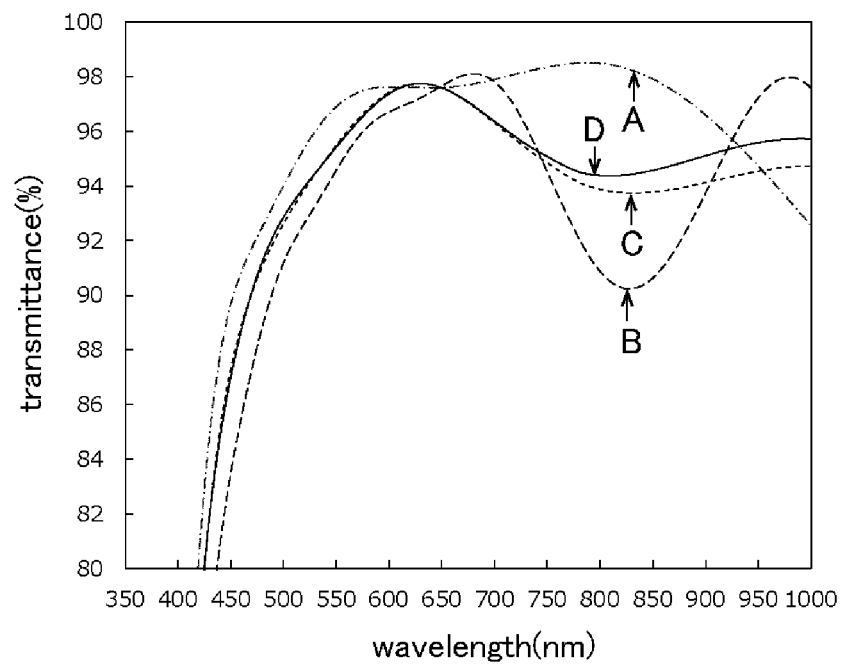
FIG. 7 is a graph showing transmission spectra of the antireflection films of Example 7 and Comparative Examples 1 to 3.
Figure 8:
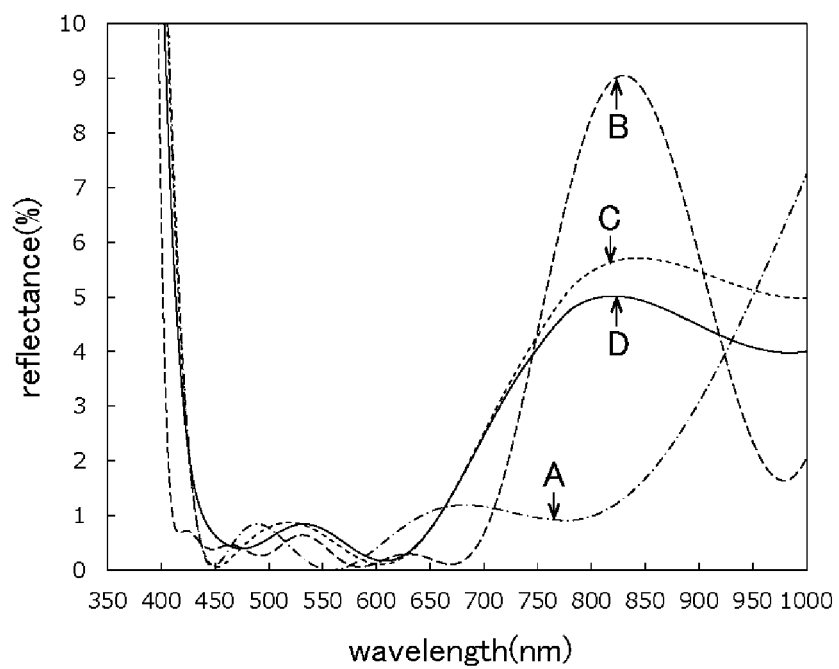
FIG. 8 is a graph showing the reflection spectra of the antireflection films of Example 7 and Comparative Examples 1 to 3.

FIG. 7 is a graph showing transmission spectra of the antireflection film of Example 7 and Comparative Example 1 to 3, in which lines A to D represent transmission spectra of Example 7 and Comparative Example 1 to 3, respectively. FIG. 8 is a graph showing the reflection spectra of the antireflection films, in which lines A to D represent the reflection spectra of Example 7 and Comparative Example 1 to 3, respectively.

It can be seen that the transmission spectrum and the reflection spectrum of Example 7 have a transmittance of 90% or more and a reflectance of 5% or less over the wavelength range of 450 to 950 nm as in the transmission spectrum and the reflection spectrum of Example 1. On the other hand, in the transmission spectrum and the reflection spectrum of Comparative Example 1, the transmittance was greatly decreased and the reflectance was greatly increased in the vicinity of the wavelength of 850 nm as compared with Example 7. In the transmission spectrum and the reflection spectrum of Comparative Example 2, the transmittance decreased and the reflectance increased in the vicinity of the wavelength 850 nm as compared with Example 7. In the transmission spectrum and the reflection spectrum of Comparative Example 3, the transmittance decreased and the reflectance increased in the vicinity of the wavelength 850 nm as compared with Example 7.

Comparative Example 4

An antireflection film was prepared in the same manner as in Example 1, except that the antireflection layer had a 4-layer structure of a total thickness of 181 nm, which was composed of, from the adhesion layer side, a first high refractive index layer composed of $Nb_2O_5$ having a physical thickness of 15 nm, a first low refractive index layer composed of $SiO_2$ having a physical thickness of 38 nm, a second high refractive index layer composed of $Nb_2O_5$ having a physical thickness of 29 nm, and a second low refractive index layer composed of $SiO_2$ having a physical thickness of 99 nm.

As shown in Table 2, the luminous reflectance Y of the antireflection film was 0.30, the a* in the CIE-Lab color system was 1.7 and the b* was −9.5, so that the color tone was evaluated as GOOD, and the transmittance of infrared rays was 89.5% and the reflectance of infrared rays was 7.2%. In the mandrel test, no crack was observed when the mandrel diameter was 6 mm, and a crack was observed when the mandrel diameter was 5 mm, so that the flexibility was evaluated as GOOD.

TABLE 1

| | | | | | | | | | |
|---|---|---|---|---|---|---|---|---|---|
| antireflection layer | $Nb_2O_5$ | (nm) | 20 | 19 | 22 | 20 | 18 | 19 | 19 |
| | $SiO_2$ | (nm) | 32 | 32 | 32 | 32 | 32 | 32 | 32 |
| | $Nb_2O_5$ | (nm) | 131 | 132 | 134 | 130 | 134 | 133 | 131 |
| | $SiO_2$ | (nm) | 94 | 93 | 94 | 93 | 94 | 94 | 94 |
| | $Nb_2O_5$ | (nm) | — | — | — | — | — | — | — |
| | $SiO_2$ | (nm) | — | — | — | — | — | — | — |
| | $Nb_2O_5$ | (nm) | — | — | — | — | — | — | — |
| | $SiO_2$ | (nm) | — | — | — | — | — | — | — |
| | $Nb_2O_5$ | (nm) | — | — | — | — | — | — | — |
| | $SiO_2$ | (nm) | — | — | — | — | — | — | — |
| antifouling layer | fluorine compound | (nm) | 3 | 3 | 3 | 3 | 3 | 3 | 3 |
| number of layers of antireflection layer | | | 4 | 4 | 4 | 4 | 4 | 4 | 4 |
| total thickness of antireflection layer | | (nm) | 277 | 276 | 282 | 275 | 278 | 278 | 276 |
| optical properties | luminous reflectance Y | (%) | 0.39 | 0.26 | 0.34 | 0.29 | 0.34 | 0.28 | 0.32 |
| | a* | | 1.4 | 4.1 | 4.6 | 2.1 | 13.0 | 8.9 | 7.7 |
| | b* | | −9.1 | −7.6 | −8.3 | −6.8 | −13.9 | −13.9 | −8.8 |
| | evaluation of reflection hue | | GOOD | GOOD | GOOD | GOOD | GOOD | GOOD | GOOD |
| | infrared transmittance | (%) | 92.9 | 91.9 | 93.3 | 91.8 | 91.8 | 93.3 | 95.0 |
| | infrared reflectance | (%) | 3.1 | 4.3 | 3.5 | 4.1 | 4.1 | 3.0 | 4.6 |
| flexibility | mandrel test | | GOOD | GOOD | GOOD | GOOD | GOOD | GOOD | GOOD |

TABLE 2

| | component | | Example 8 | Example 9 | Example 10 | Comparative Example 1 | Comparative Example 2 | Comparative Example 3 | Comparative Example 4 |
|---|---|---|---|---|---|---|---|---|---|
| base material | TAC | (μm) | 80 | 80 | 80 | 80 | 80 | 80 | 80 |
| hard coat layer | acrylic resin | (μm) | 5 | 5 | 5 | 5 | 5 | 5 | 5 |
| adhesion layer | $SiO_x$ | (nm) | 3 | 3 | 3 | 3 | 3 | 3 | 3 |
| antireflection layer | $Nb_2O_5$ | (nm) | 13.7 | 12 | 13.7 | 14 | 7 | 13 | 15 |
| | $SiO_2$ | (nm) | 49 | 49 | 49 | 32 | 35 | 41 | 38 |
| | $Nb_2O_5$ | (nm) | 44 | 44 | 44 | 130 | 12 | 37 | 29 |
| | $SiO_2$ | (nm) | 30.3 | 30.3 | 30.3 | 35 | 25 | 22 | 99 |
| | $Nb_2O_5$ | (nm) | 34 | 34 | 32 | 18 | 34 | 131 | — |
| | $SiO_2$ | (nm) | 103 | 103 | 101 | 230 | 23 | 93 | — |
| | $Nb_2O_5$ | (nm) | — | — | — | 25 | 129 | — | — |
| | $SiO_2$ | (nm) | — | — | — | 33 | 91 | — | — |
| | $Nb_2O_5$ | (nm) | — | — | — | 37 | — | — | — |
| | $SiO_2$ | (nm) | — | — | — | 100 | — | — | — |
| antifouling layer | fluorine compound | (nm) | 3 | 3 | 3 | 3 | 3 | 3 | 3 |
| number of layers of antireflection layer | | | 6 | 6 | 6 | 10 | 8 | 6 | 4 |
| total thickness of antireflection layer | | (nm) | 274 | 272.3 | 270 | 654 | 356 | 337 | 181 |
| optical properties | luminous reflectance Y | (%) | 0.66 | 0.96 | 0.74 | 0.34 | 0.54 | 0.58 | 0.30 |
| | a* | | 6.6 | 12.6 | 4.1 | −2.6 | −3.0 | −0.5 | 1.7 |
| | b* | | −15.8 | −15.3 | −9.5 | −2.8 | −3.8 | −6.6 | −9.5 |
| | evaluation of reflection hue | | GOOD | GOOD | GOOD | BAD | BAD | BAD | GOOD |
| | infrared transmittance | (%) | 92.7 | 93.1 | 92.1 | 96.6 | 94.5 | 89.7 | 89.5 |
| | infrared reflectance | (%) | 2.1 | 3.3 | 4.9 | 2.9 | 5.2 | 4.1 | 7.2 |
| flexibility | mandrel test | | GOOD | GOOD | GOOD | BAD | BAD | BAD | GOOD |

By forming the antireflection layer into a 4-layer structure as in Examples 1 to 7, it was possible to obtain a high infrared transmittance and excellent flexibility. In addition, in the antireflection layer having a 4-layer structure, it was possible to achieve both of the high transmittance of infrared rays and the neutral color tone of reflected light.

Further, by forming the antireflection layer in a 6-layer structure as in Example 8 to 10, it was possible to obtain a high infrared transmittance and excellent flexibility. In addition, in the antireflection layer having a 6-layer structure, it was possible to achieve both of the high transmittance of infrared rays and the neutral color tone of reflected light.

On the other hand, as in Comparative Example 1, in the 10-layer structure having a total thickness of 600 nm or more, although a high infrared transmittance was obtained, it was not possible to make the color tone of the reflected light neutral and to obtain excellent flexibility. Further, as in Comparative Example 2, in the 8-layer structure having a total thickness of more than 300 nm, although a high infrared transmittance was obtained, it was not possible to make the color tone of the reflected light neutral and to obtain excellent flexibility. Further, as in Comparative Example 3, in the 6-layer structure having a total thickness of more than 300 nm, a high infrared transmittance could not be obtained, the color tone of reflected light could not be made neutral, and excellent flexibility could not be obtained. Further, as in Comparative Example 4, in the 4-layer structure in which the thickness of the antireflection layer was less than 200 nm, a high infrared transmittance could not be obtained.

DESCRIPTION OF REFERENCE CHARACTERS

10 base material, 20 hard coat layer, 30 adhesion layer, 40 antireflection layer, 50 antifouling layer, 60 base film, 61 unwinding roll, 62 winding roll, 71 first can roll, 72 second can roll, 81 first optical monitor, 82 second optical monitor

The invention claimed is:

1. An antireflection film having a hard coat layer, an adhesion layer, and an antireflection layer in this order on a base material,
   wherein, from the adhesion layer side, the antireflection layer-comprises consists of:
   a first high refractive index layer consisting of $Nb_2O_5$ and having a physical thickness of 18 to 22 nm;
   a first low refractive index layer consisting of $SiO_2$ and having a physical thickness of 28 to 36 nm;
   a second high refractive index layer consisting of $Nb_2O_5$ and having a physical thickness of 130 to 134 nm; and
   a second low refractive index layer consisting of $SiO_2$ and having a physical thickness of 92 to 95 nm;
   and wherein a transmittance of light at a wavelength of 940 nm is 90% or more;
   a reflectance of light at a wavelength of 940 nm is 5% or less; and
   an a* value in CIELAB is 0 to 15 and the b* value is −18 to 0.

2. The antireflection film according to claim 1, further comprising an antifouling layer laminated on the antireflection layer.

3. The antireflection film according to claim 1, wherein the antireflection film has a luminous reflectance Y of 1.0% or less.

4. A method for manufacturing an antireflection film according to claim 1, comprising steps of forming the hard coat layer, the adhesion layer, and the antireflection layer in this order on the base material.

5. The method according to claim 4, further comprising a step of laminating an antifouling layer on the antireflection layer.

* * * * *